(12) United States Patent
Hawwa et al.

(10) Patent No.: US 6,515,791 B1
(45) Date of Patent: Feb. 4, 2003

(54) ACTIVE REFLECTION AND ANTI-REFLECTION OPTICAL SWITCH

(75) Inventors: Muhammad A. Hawwa, Fremont, CA (US); Aric Menon, Fremont, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 10/074,494

(22) Filed: Feb. 11, 2002

Related U.S. Application Data
(60) Provisional application No. 60/281,935, filed on Apr. 6, 2001.

(51) Int. Cl.[7] .............................. G02F 1/00; G02F 1/29
(52) U.S. Cl. ....................................... 359/323; 359/320
(58) Field of Search ........................ 359/315, 320–323, 359/245, 230, 226, 224, 290, 291

(56) References Cited

U.S. PATENT DOCUMENTS

| | | | |
|---|---|---|---|
| 5,943,158 A | 8/1999 | Ford et al. | 359/295 |
| 5,949,571 A | 9/1999 | Goosen et al. | 359/291 |
| 2002/0015215 A1 * | 2/2002 | Miles | 359/290 |
| 2002/0141036 A1 * | 10/2002 | Jin et al. | 359/291 |

OTHER PUBLICATIONS

Goosen, K.W. "Silicon Modulator Based on Mechanically–Active Anti–Reflection Layer with 1 Mbit/sec Capability for Fiber–in–the–Loop Applications", IEEE Photonics Technology Letters, vol. 8, No. 9, Sep. 1994, pagesn 1119–1121.

"MARS, Silicon Modulator Based on Mechanically–Active Anti–Reflection Switch for Fiber–in–the–loop Application (Mechanical and Anti–Reflection Switch)", Laser Lab, undated.

"MEMS device compensates for gain slope in optical amplifiers" published on the Internet, at URL www.optoelectronics–wold.com, Oct. 2000.

\* cited by examiner

*Primary Examiner*—Georgia Epps
*Assistant Examiner*—William Choi
(74) *Attorney, Agent, or Firm*—Samuel A. Kassatly

(57) ABSTRACT

An active, optical, piezoelectric actuated modulator allows switching between a reflecting state and an anti-reflecting state. The modulator, or switch, is based on the precise controlling of an air gap between a thin film membrane and a substrate. The thin film membrane is deformed by a miniaturized adaptive material, such as electrostrictive or piezoelectric (PZT) material. Maximum optical reflection is realized when the air gap is equal to a multiple of a quarter wavelength of an impinging optical beam, while anti-reflection is achieved when the thickness of the air gap is equal to zero or is different from a multiple of the quarter wavelength of the optical beam.

58 Claims, 6 Drawing Sheets

INPUTS
OUTPUTS

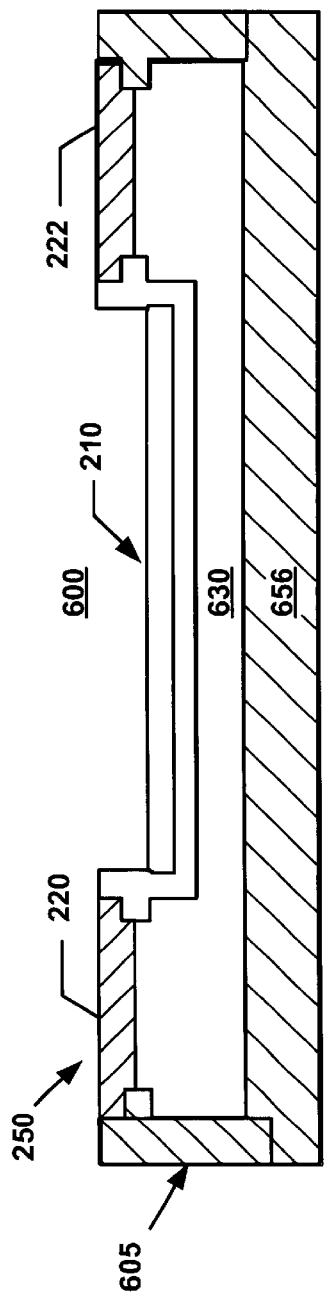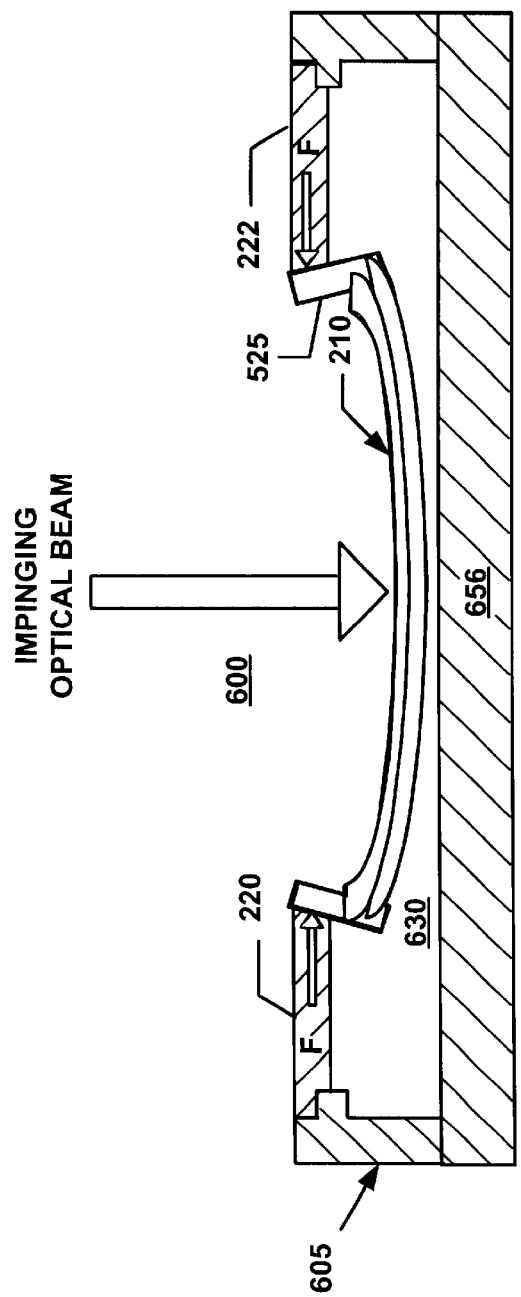

ACTIVE REFLECTION AND ANTI-REFLECTION OPTICAL SWITCH

PRIORITY CLAIM

The present application claims the priority of co-pending provisional application, Ser. No. 60/281,935, filed on Apr. 6, 2001, titled "Active Reflection and Anti-Reflection Optical Switch," which is assigned to the same assignee as the present application, and which is incorporated herein by reference.

CROSS-REFERENCE TO RELATED APPLICATIONS

The present application relates to co-pending U.S. pat. application, Ser. No. 09/884,702, filed on Jun. 19, 2001, titled "Piezoelectric Actuated Optical Switch," which claims the priority of U.S. provisional patent application, Ser. No. 60/246,284, filed on Nov. 6, 2000, both of which applications are assigned to the same assignee as the present application, and are incorporated herein by reference.

FIELD OF THE INVENTION

The present invention relates generally to optical signal switching, and particularly to a piezoelectric actuated device for switching an optical signal. More specifically, the present invention relates to an active optical modulator that allows switching from a reflecting state to an anti-reflecting state and vice versa. The switch is based on the precise controlling of an air gap between a thin film membrane and a substrate. The thin film membrane is deformed by a miniaturized adaptive material, such as electrostrictive or piezoelectric (PZT) material. Maximum optical reflection is realized when the air gap is equal to a quarter wavelength of the optical beam, while anti-reflection is achieved when the thickness of the air gap is different from the quarter wavelength.

BACKGROUND OF THE INVENTION

With the increasing popularity of the World Wide Web ("the web"), there is a continual need to increase the available communication bandwidth. The constant traffic on the web requires an infrastructure that is dynamic to accommodate new needs as they emerge. One of the most pressing challenges is the underlying pipeline, that is the bandwidth which accommodates new users and applications. Some of these applications include as video on demand, video conferencing, and so forth.

A number of photonic solutions have been proposed to increase the available network bandwidth. These solutions range from point to point connections to wavelength division multiplexed passive optical network systems. The latter solution is effective in principle, however the cost associated with photonic devices in these systems has been an impediment to their acceptance and rapid deployment.

Optical data transmission offers many advantages over electrical and broadcast transmission. However, switching optical data from one channel to another has proven to be problematic. Fundamentally, a beam of light is unaffected by passage through an electric or magnetic gradient, thus the usual solid-state methods for switching electric signals are not effective to switch optical signals. Accordingly, various mechanical techniques relying typically on reflection or refraction have been developed to divert optical signals.

FIG. 1 is a schematic diagram of a conventional optical switching array 10. The switching array 10 includes a plurality of input ports, i.e., 12, 16, and output ports 14 arranged in columns and rows. To switch an optical signal from a first input port 16 to the output port 14, a diverter 18 located at a point of intersection between the axes of the two ports 16 and 14, diverts the beam from the input port 16 to the output port 14. The diverter 18 can be a mirror, a light pipe, a refractive medium, or the like. Most diverters 18 require a form of actuation to move them into or out of the path of a light beam.

FIG. 2 shows a cross-section of a MEMS diverter 18. The diverter 18 is comprised of a base 32 suspended within a frame 34. The base 32 includes a reflective coating 36. Between the frame 34 and the bottom of the base 32 is an interdigitated electrostatic actuator 37 comprising interdigitated fingers 38 and 39 of the base 32 and frame 34, respectively. The interdigitated electrostatic actuator 37 is actuated by applying electric charges to surfaces of fingers 38 and 39 to cause them to attract each other. The electric charges can be applied to specific fingers 38 and 39, or to sets of fingers 38 and 39, to modify how much force is applied, and in what direction, to control the induced tilting of base 32.

Conventional MEMS diverters, however, suffer from some drawbacks. In addition to being expensive to produce, they are also sensitive to electrostatic discharges (ESD) and microcontamination. It will be readily appreciated that ESD can destroy the interdigitated electrostatic actuator 37 by melting or fusing fingers 38 and 39. Similarly, microcontamination in the form of fine particles or surface films, for example, can mechanically jam the interdigitated electrostatic actuator 37 and prevent it from actuating. Microcontamination can also create an electrical short between fingers 38 and 39, thereby preventing actuation.

A low-cost silicon optical modulator based on micro electro mechanical systems principles (MEMS) has been proposed, offering a low-cost, high production volume modulator. This device has been designated MARS, which is an acronym for Moving Anti-Reflection Switch. In one form, this device has a multi-layer film stack of polysilicon/silicon nitride/polysilicon, wherein the polysilicon is doped and forms the electrode material. A precisely controlled air gap between the film stack and the substrate allows switching from a reflecting state to an anti-reflecting state.

The operating principle of a conventional MARS device 100 is illustrated in FIGS. 3, 4, and 5, and is based upon the change in an air gap 105 between a suspended membrane 110, e.g., a silicon nitride film, and an underlying substrate 120. The membrane 110 has a refractive index equal to the square root of the refractive index of the substrate, and a thickness equal to ¼ the wavelength ($\lambda/4$) of an incident light beam.

If the membrane 110 is suspended above the substrate 120 such that when the air gap 105 equals $\lambda/4$, a high reflection state is achieved, otherwise, including when the air gap 105 is close to zero, an anti-reflection state is achieved. These states also hold true for any value of $m\lambda/4$, wherein an even number m represents an anti-reflecting state (or mode), and an odd number m represents a reflecting state. An exemplary MARS structure that is referred to as a double-poly MARS device, is described in U.S. Pat. No. 5,654,819.

To activate this MARS device, two electrodes are provided and positioned on top of the membrane 110 and the substrate 120, with a voltage selectively applied therebetween. The applied voltage creates an electrostatic force that pulls the membrane 110 physically closer to the substrate 120. When thickness (depth) of the air gap 105 between the membrane 110 and the substrate 120 is reduced to substantially λ/2, an anti-reflective device exhibiting substantially zero reflectivity is produced.

While this MARS device 100 provides certain advantages over other prior conventional devices, it has a potential catastrophic failure mode due to the lower polysilicon metallization. This failure mode is illustrated in FIG. 5, where in certain adverse conditions, such as large changes in the dielectric properties of the air gap 105, or with unusual voltage surges (i.e., electrostatic discharge or ESD) in the switching signal the membrane 110 undergoes excessive deflection, and shorts to the substrate 120, resulting in a device (100) failure.

Accordingly, it would be desirable to have an optical switching device that can redirect a beam of light that is less susceptible to microcontamination and ESD failures, and that is readily fabricated according to developed microfabrication technologies.

SUMMARY OF THE INVENTION

The present invention addresses and resolves the foregoing concerns that could lead to potential failure of the MEMS-based devices, namely (i) spurious voltage spikes and (ii) large changes in the dielectric properties of the air in the air gap.

The active optical switch of the present invention includes a thin film membrane, that is suspended over a substrate, and that is mechanically deformed by a miniaturized motor, to perform the reflection and anti-reflection switching. In a preferred embodiment, the motor is comprised, for example, of an adaptive or electrostrictive material, such as piezoelectric (PZT). The displacing voltage is applied to the motor rather than to the membrane.

Consequently, the membrane and the substrate are not electrically charged as are the corresponding components of the conventional MARS device described above in connection with FIGS. 3 through 5. Thus, the switch of the present invention is tolerant of a direct contact between the membrane and the substrate, thereby solving the spurious voltage spikes concern.

In addition, in further contrast to the conventional MARS device described above, the switch of the present invention neither uses nor relies on the air properties in the gap between the membrane and the substrate as an electrically conductive medium to activate the motion of the membrane. The movement of the membrane is caused by the contraction or expansion of the motor.

This novel design addresses and solves the concern facing the MARS device described above, namely large changes in the dielectric properties of the air in the air gap. Moreover, due to fact that the substrate is no longer required to be electrically charged, it does not have to be made from special material, such as silicon, nor fabricated using special microfabrication techniques, in effect reducing the cost, labor, and material of the optical switch.

BRIEF DESCRIPTION OF THE DRAWINGS

The features of the present invention and the manner of attaining them, will become apparent and the invention itself will be better understood by reference to the following description and the accompanying drawings, wherein:

FIG. 9 is a cross-sectional view of an optical switch according to another embodiment of the present invention, shown prior to activation;

FIG. 10 is a cross-sectional view of the optical switch of FIG. 7, shown after activation.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 6:
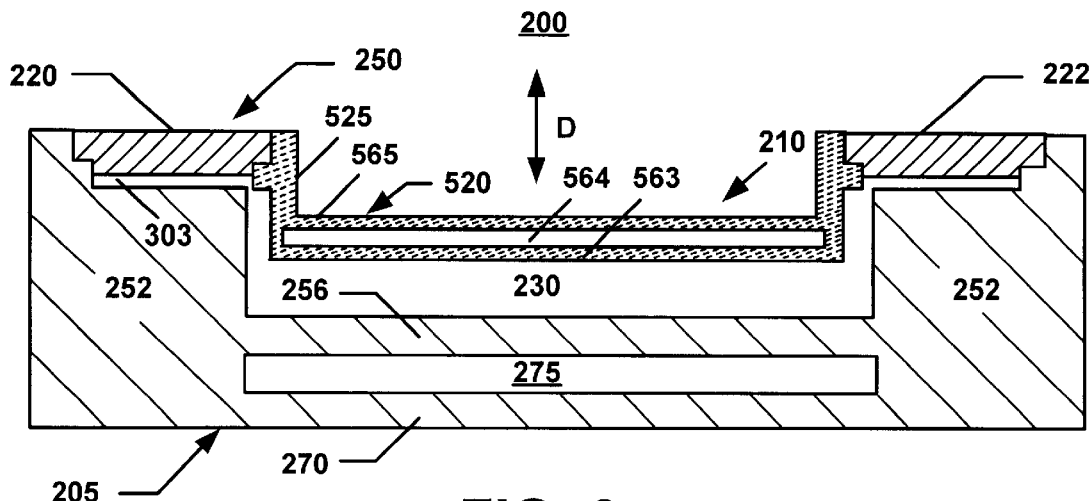
FIG. 6 is a cross-sectional view of an optical switch made in accordance with the present invention, taken along line A—A of FIG. 7, and showing the constituent components of the optical switch.
Figure 7:
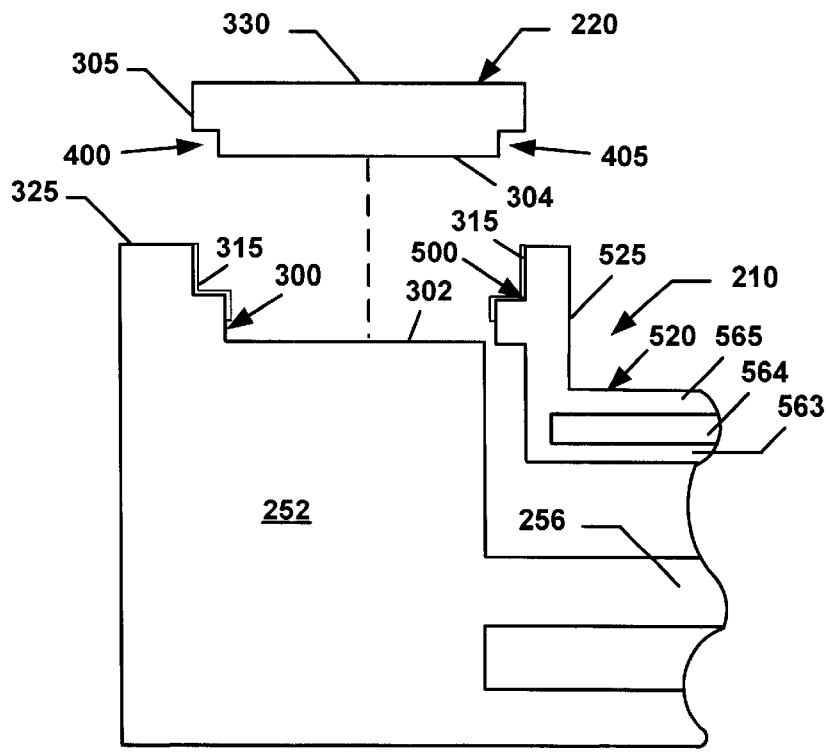
FIG. 7 is an enlarged, fragmentary view of a section of the switch of FIG. 6, illustrating the attachment of an active element to a base and a membrane.
Figure 8:
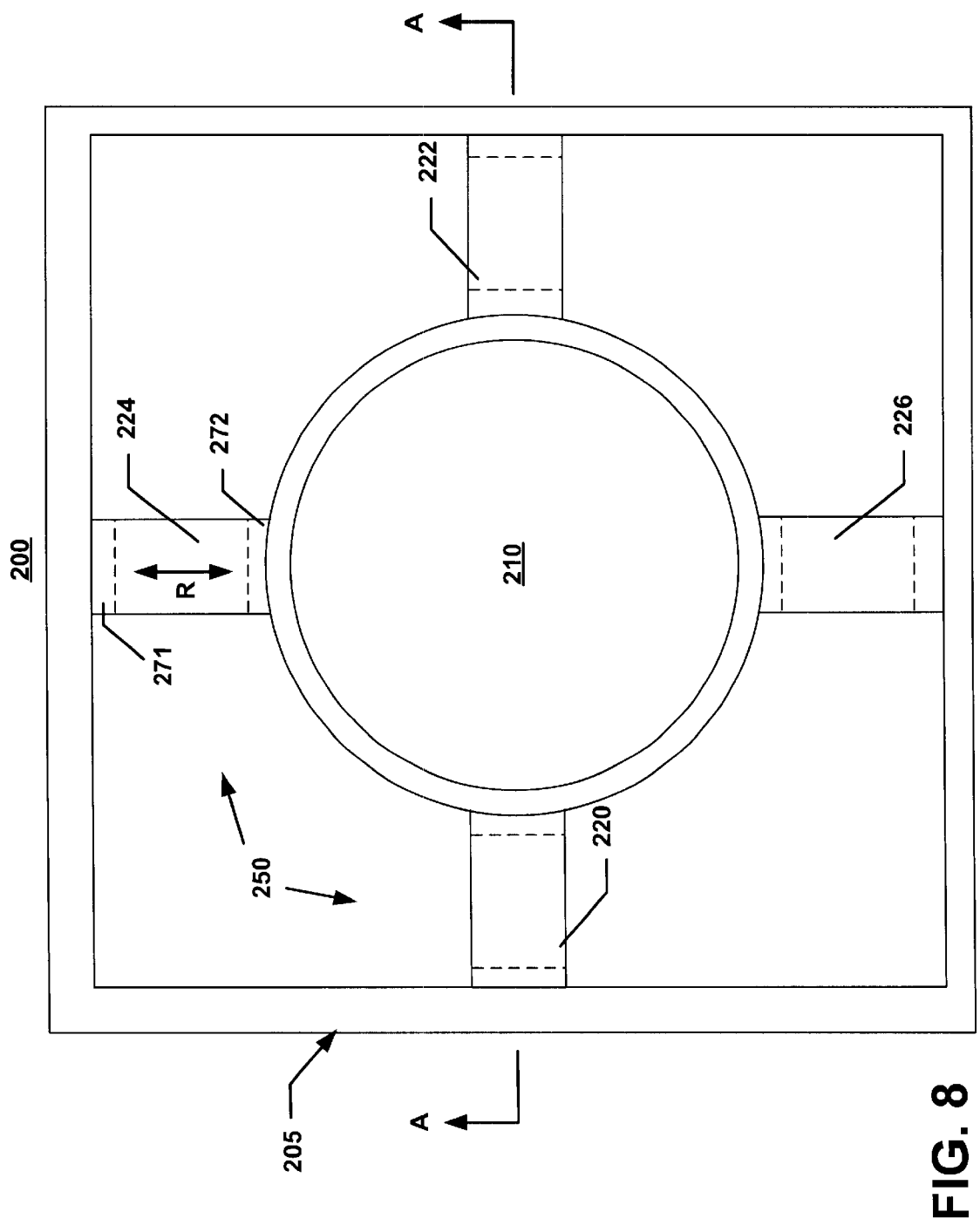
FIG. 8 is a top plan view of the optical switch of FIG. 6.

Referring to FIGS. 6, 7, and 8, they illustrate an optical switch 200 made according to a preferred embodiment of the present invention. The optical switch 200 is generally comprised of a base 205 and a membrane 210. The membrane 210 is movably connected to the base 205 and is suspended thereto by a plurality of active elements 220, 222, 224, 226.

The base 205 is comprised of a substrate 256, above which the membrane 210 is supported. An air gap 230 is formed between the membrane 210 and the base 205.

The active members 220, 222, 224, 226 are collectively referred to herein as motor 250. While only four active members 220, 222, 224, 226 are shown in FIG. 8, it should be clear that a different number of active members can be used, without departing from the scope of the invention.

The motor 250 is formed of an active material that develops an electric potential (or voltage) in response to mechanical deformation, and that mechanically deforms in response to an applied electric potential. This is commonly known as the piezoelectric effect. Piezoelectric materials are used in a wide variety of applications including transducers, spark generators for butane lighters, and vibration damping.

In a preferred embodiment, the active material is piezoelectric (PZT) which is typically either ceramic or polymeric. Common ceramic piezoelectric materials include, for example, quartz, cadmium sulphide, and titanate compounds such as barium titanate, lead titanate, and lead zirconium titanate. Common polymeric piezoelectric materials include, for example, polyvinylidene fluoride (PVDF), copolymers of vinylidene fluoride and trifluoroethylene (VDF/TrFE), copolymers of vinylidene fluoride and tetrafluoroethylene (VDF/TeFE), and copolymers of vinylidene cyanide and vinyl acetate (VDCN/VA).

A distinctive feature of the present invention is that the membrane 210 is not directly secured to the base 205, but is rather linked thereto by means of the motor 250. Accordingly, the membrane 210 is freely deformable relative to the substrate 256.

In addition, the membrane 210 and the substrate 256 do not need to be electrically charged. As such, the switch 200 is tolerant of even a direct contact between the membrane 210 and the substrate 256, should this condition materialize.

In operation, and as it will be explained later in more detail in connection with FIGS. 8 and 9, a change in the reflection state (i.e., reflective or anti-reflective) of the optical switch 200 is induced by a corresponding change in the depth of the air gap 230. Such a change in the air gap (205) depth is induced by the deformation of the membrane 210.

The membrane 210, which is suspended over the substrate 256, is mechanically deformed by the miniaturized motor 250, to perform the reflection and anti-reflection switching. In a preferred embodiment, the motor 250 is comprised, for example, of an adaptive material, such as an electrostrictive or piezoelectric (PZT) material.

A displacing potential is applied to the motor 250 rather than to the membrane 210, by means of a plurality of electrodes. Only two electrodes 271 and 272 are shown in FIG. 8 to stimulate active element 224 of the motor 250 along the radial direction R. It should be clear that each of the other active elements 220, 222, 226, may be supplied with similar electrodes, in order to achieve a uniform, desired deformation of the membrane 210.

Figure 1:
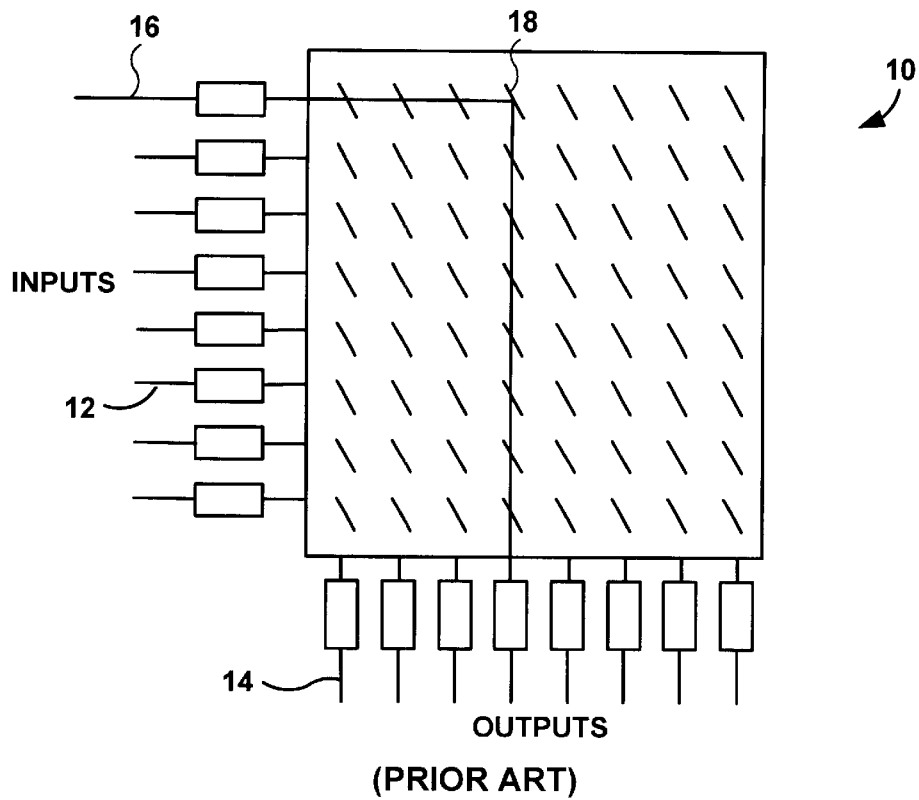
FIG. 1 is a schematic diagram of a MEMS optical switching array of the prior art.
Figure 2:
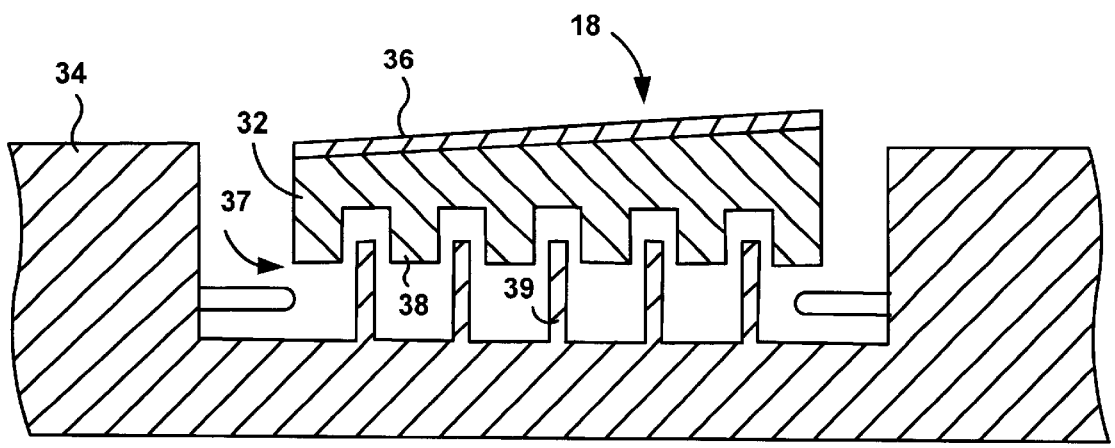
FIG. 2 is a cross-sectional view of a diverter used in the MEMS optical switching array of FIG. 1.
Figure 3:
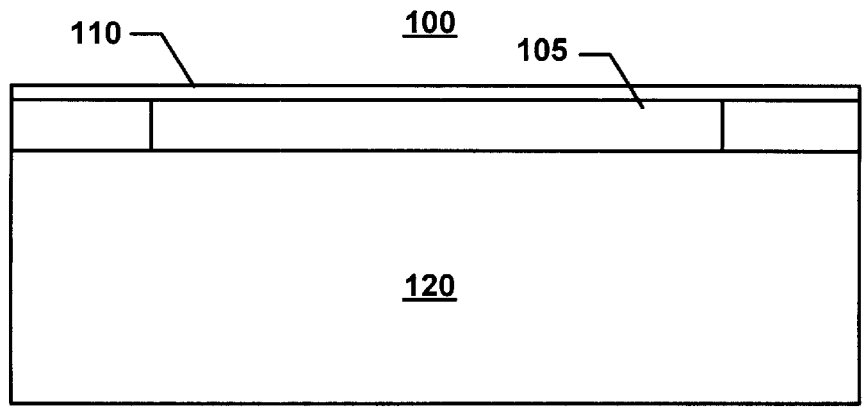
FIG. 3 is a schematic representation of a MARS device of the prior art, shown in a resting state.
Figure 4:
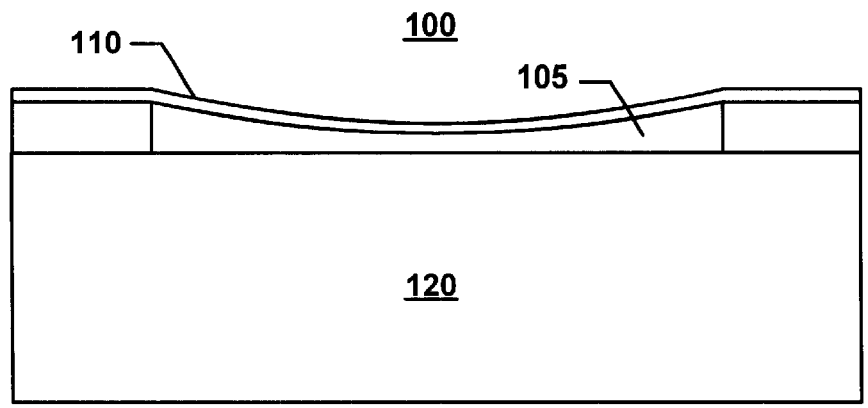
FIG. 4 is a representation of the MARS device of FIG. 3, shown in an anti-reflecting state.
Figure 5:
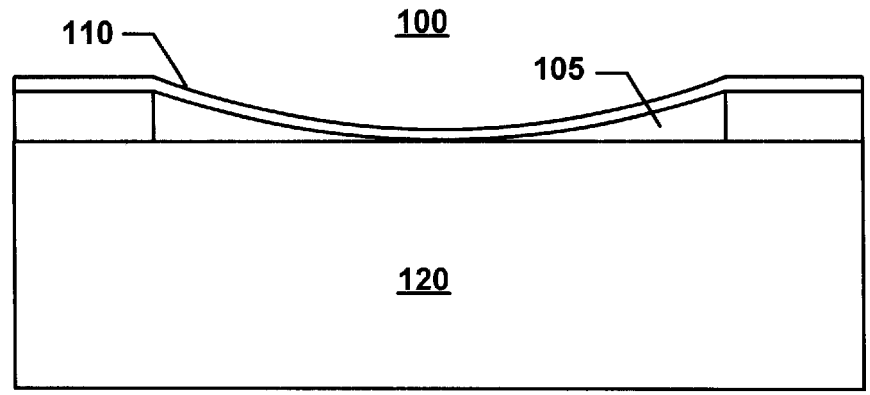
FIG. 5 is a schematic view of the MARS device of FIGS. 3 and 4, illustrating a failure mode.

In addition, in further contrast to the MARS device described above in connection with FIGS. 3–5, the switch 200 neither uses nor relies on the properties of the air within the air gap 230 as an electrically conductive medium to activate the deformation of the membrane 210, in that the deformation of the membrane 210 is caused by the contraction or expansion of the motor 250.

Having described the general environment and field of the optical switch 200, and its mode of operation, its constituent components will now be described in greater detail. In the embodiment of FIGS. 6 and 7, the base 205 is comprised of a generally cylindrically shaped leg 252 that contours the air gap 230, to support the motor 250.

The base 205 is further comprised of the substrate 256, above which the membrane 210 is supported by the leg 252. With more specific reference to FIG. 7, the leg 252 includes a stepped edge 300 on which one end 305 of the active element 220 is seated. The active element 220, is secured to the stepped edge 300 by means of, for example, an adhesive layer 315. The stepped edge 300 extends integrally in an upper surface 302.

When the active element 220 is secured to the stepped edge 300, the flat upper surface 325 of leg 252 is flush with the upper surface 330 of the active element 220. The upper surface 302 extends under the active element 220 and forms an air pocket or gap 303 with the underside 304 (FIG. 7) of the active member 220 (FIG. 6).

The air pocket or gap 303 is in communication with the air gap 230 to allow the free movement or displacement of the active elements 220, 222, 224, 226, and to prevent friction between the motor and the base. The remaining active elements 222, 224, 226 are similarly secured to the base 205, to result in the optical switch (200) design shown in FIG. 8.

The substrate 256 extends integrally from the leg 252, under the membrane 210. Preferably, the substrate 256 has the same shape as that membrane 210. In the example shown in FIG. 8, the membrane 210 and the substrate 256 are circularly shaped. It should however be clear that other shapes may alternatively be employed.

In the embodiment of FIG. 6, the base 205 further includes a bottom section 270. The substrate 256 extends above the bottom section 270, and is separated therefrom by a gap 275. According to another embodiment, the gap 275 is not included so that the substrate 256 is integral with the bottom section 270.

The base 205, including the substrate 256 may be formed of a conductive material that is either optically transparent or absorbing over an operating optical bandwidth. Suitable materials for the base 205 include, but are not limited to silicon, gallium arsenide, indium phosphide, germanium, indium tin oxide (ITO) coated glass, wafer or metal, or other suitable material.

The active elements 220, 222, 224, 226 of the motor 250 are substantially similar in function and design, and therefore only the active element 220 will now be described in more detail, with reference to FIGS. 6–8. In this embodiment, the upper surface 330 of the active element 220 is generally rectangularly shaped, with the understanding that other shapes may alternatively be employed.

The underside of the active element 220 includes two stepped edges 400 and 405. The stepped edge 400 fits the stepped edge 300 of the leg 252. The other stepped edge 405 of the active element 220 is shaped to fit a stepped edge 500 of the membrane 210. The stepped structure 400, 405 provides improved structural integrity and stronger adhesive bonding of the motor 250 to the base 205 and the membrane 210.

The active element 220 links the base 205 and the membrane 210 while creating a lever effect, so that the membrane 210 is forced to be deformed along an axial direction D or optical direction (FIG. 6) of an impinging optical beam, such as a laser beam, by the motor 250.

In another embodiment, the active element 220 does not include the stepped edges 400, 405, but a stronger adhesive bonding of the motor 250 to the base 205 and the membrane 210, might be required.

Still with reference to FIGS. 6 through 8, the membrane 210 is comprised of a well 520 that is contoured by a peripheral wall 525. The peripheral wall 525 is generally circularly shaped (FIG. 8), though other shapes could be used. The membrane 210 extends radially outwardly, into one or more stepped edges 500 to support the active elements 220, 222, 224, 226 of the motor 250, as explained earlier.

The well 520 of the membrane 210 is formed of multiple layers of materials, in this example, three layers 563, 564, 565. The first layer 563 is composed of polysilicon and extends over the gap 230. It should be clear that the first layer 563 can be made of any other suitable amorphous silicon. It is also preferred that the first layer 563 be made of a material that is transparent to the optical beam.

The thickness of the first layer 563 is preferably one-quarter wavelength of the impinging optical beam being switched. For example, if the metallization is polysilicon, and the wavelength of the optical beam being switched is 1.55 μm, the thickness of first layer 563 is preferably approximately 1100 Angstroms.

The second layer 564 is composed of silicon nitride, and is formed over the polysilicon layer 564.

The silicon nitride layer 564 preferably has a refractive index approximately equal to the square root of the substrate 256, and has a thickness of one-quarter the wavelength of the optical beam. Techniques for tailoring the refractive index of a material are well known and described in, e.g., Smith et al, "Mechanism of SiNx Hy Deposition From N2—SiH4 Plasma", J. Vac. Sci. Tech. B(8), #3, pp 551–557 (1990).

The third layer is preferably similar in composition to the first layer 563, and can be composed, for example, of polysilicon, or another suitable, optically transparent material. The third layer may alternatively be made of indium tin oxide.

The thickness of third layer 565 is preferably one-half the wavelength of the optical beam. An advantage of using polysilicon for layers 563 and 565 is that the index of refraction of these layers essentially matches the index of refraction of substrate 256. It is also relatively transparent to laser radiation of interest, i.e. 1.3 $\mu$m and 1.55 $\mu$m.

Referring now to FIGS. 9 and 10 they illustrate an alternative optical switch 600 that is generally similar in function to the optical switch 200. The optical switch 600 is comprised of a base 605, the motor active elements 220, 222, 224, 226, and the membrane 210, and defines a gap 630 between the membrane 210 and the base 605.

The base 605 is generally similar to the base 205 described earlier, but has a simplified design, in that the base 605 does not include the expanded design of leg 252. In addition, the base 605 includes substrate 656 that is more basic in construction and design than the substrate 256 and the bottom section 270 and gap 275.

FIG. 9 illustrates the optical switch 600 prior to activation, i.e., before the motor 250 changes its physical properties leading to deformation (expansion or contraction). FIG. 10 illustrates the optical switch 600 subsequent to activation, and illustrates the effect generated by an exemplary expansion of the motor 250.

When a potential is selectively applied across the motor 250, lateral forces "F" to the wall 525 of the membrane 210. In a preferred embodiment, the lateral forces "F" generated by two oppositely disposed pairs of active members (220, 222) and (224, 226) are generally equal and opposite in direction. According to the present exemplary embodiment, all four forces "F" generated by all four active members 220, 222, 224, 226 are equal in magnitude.

As illustrated in FIG. 10, the forces "F" causing a lever effect, force the membrane 210 to deform axially, inwardly, toward the membrane 656, thus selectively and controllably varying the width of the air gap 630 between the substrate 656 and the membrane 210. Changing the air gap (630) thickness would change the reflection characteristics of the optical switch 600 from a non-reflecting state to a reflecting state, or vice versa, enabling it to perform the desired switching function.

Figure 11:
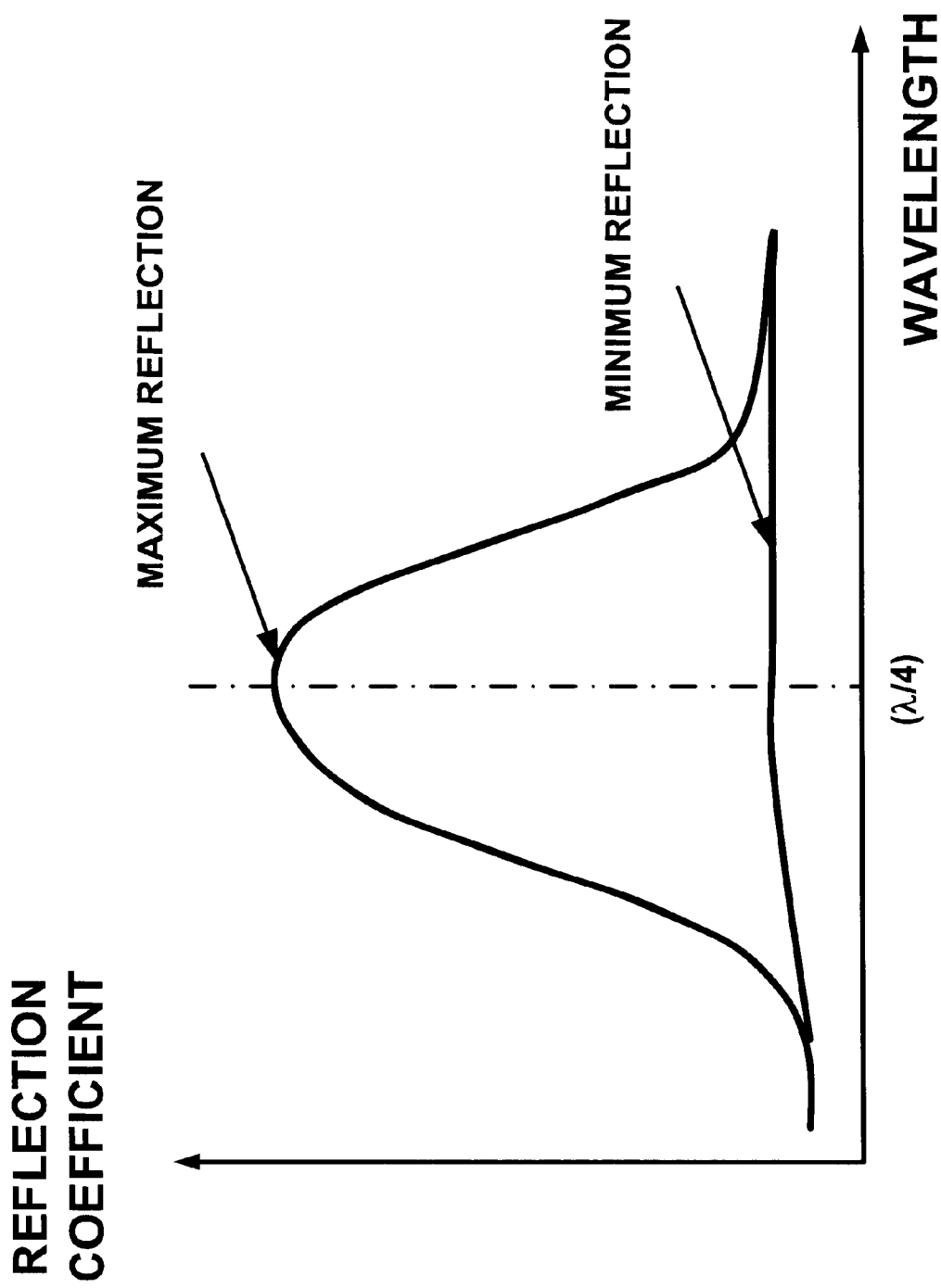
FIG. 11 is an exemplary graph illustrating the relationship between the reflection property and the air gap thickness of the optical switches of FIGS. 6 through 10, as a function of the wavelength of an impinging optical beam.

FIG. 11 is a graph that displays the relationship between the amount of reflection due to the air gap (230, 630) thickness as a function of the wavelength of the incoming optical beam, and the reflection/anti-reflection property of the optical switch (200, 600). The graph shows that the maximum reflection is achieved by this optical switch (200, 600) when the air gap thickness is equal to a factor of ¼ the wavelength of the optical beam. Anti-reflection is reached when the air gap thickness is reduced to zero or is different from a factor of ¼ the wavelength of the optical beam.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment. As an example, while the various motors have been described herein to be comprised of piezoelectric material, it should be clear that other active materials, such as, electrostrictive material, memory alloy, smart material, and so forth, could alternatively be employed.

What is claimed is:

1. An optical switch that allows switching between a reflecting state and an anti-reflecting state, comprising:
   a base that includes a substrate;
   a membrane that is suspended over the substrate, that forms an air gap between the substrate, and that is freely deformable relative to the substrate; and
   an actuator, secured between the base and the membrane, that controls the air gap by deforming the membrane, to allow switching between the reflecting and anti-reflecting states.

2. The optical switch of claim 1, wherein the actuator is made of an adaptive material.

3. The optical switch of claim 2, wherein the adaptive material comprises an electrostrictive material.

4. The optical switch of claim 2, wherein the adaptive material comprises a piezoelectric material.

5. The optical switch of claim 2, wherein a maximum reflection state is realized when an air gap thickness is equal to a multiple of a quarter wavelength of an impinging optical beam.

6. The optical switch of claim 2, wherein the anti-reflecting state is realized when an air gap thickness is not equal to a multiple of a quarter wavelength of an impinging optical beam.

7. The optical switch of claim 2, wherein the anti-reflecting state is realized when an air gap thickness is approximately zero.

8. The optical switch of claim 1, wherein the membrane is made of a non-electrically conductive material.

9. The optical switch of claim 1, wherein the movement of the membrane is caused by any of a contraction or expansion of the actuator.

10. The optical switch of claim 1, wherein the actuator comprises a plurality of active elements.

11. The optical switch of claim 10, wherein the actuator comprises four active elements that support, and are equidistally disposed around the membrane.

12. The optical switch of claim 10, wherein each of the active elements develops an electric potential in response to mechanical deformation, and that mechanically deforms in response to an applied electric potential.

13. The optical switch of claim 4, wherein the piezoelectric material is of a ceramic type.

14. The optical switch of claim 4, wherein the piezoelectric material is of a polymeric type.

15. The optical switch of claim 13, wherein the ceramic type piezoelectric material is made of any of: quartz, cadmium sulphide, or a titanate compound.

16. The optical switch of claim 4, wherein the titanate compound is any of: barium titanate, lead titanate, or lead zirconium titanate.

17. The optical switch of claim 14, wherein the polymeric type piezoelectric material is made of any of: polyvinylidene fluoride, a copolymer of vinylidene fluoride, trifluoroethylene, a copolymer of vinylidene fluoride and tetrafluoroethylene, or a copolymer of vinylidene cyanide and vinyl acetate.

18. The optical switch of claim 10, wherein the base is comprised of a generally cylindrically shaped leg that contours the air gap to support the active elements.

19. The optical switch of claim 18, wherein for each active element, the leg comprises a stepped edge on which one end of the active element is seated.

20. The optical switch of claim 19, wherein when the active element is secured to the stepped edge, an air pocket is formed between the active element and the leg, to allow free displacement of the active elements, and to prevent friction between the actuator and the base.

21. The optical switch of claim 1, wherein the substrate is formed of a conductive material that is optically transparent over an operating optical bandwidth.

22. The optical switch of claim 1, wherein the substrate is formed of a conductive material that is optically absorbing over an operating optical bandwidth.

23. The optical switch of claim 22, wherein the substrate is made of any of: silicon, gallium arsenide, indium phosphide, germanium, or indium tin oxide coated glass.

24. The optical switch of claim 10, wherein when the active elements are secured between the base and the membrane, they create a lever effect so that the membrane is deformed along an optical of an impinging optical beam.

25. The optical switch of claim 10, wherein the membrane comprises a well that is contoured by a peripheral wall.

26. The optical switch of claim 25, wherein the peripheral wall is circularly shaped.

27. The optical switch of claim 26, wherein the membrane extends radially outwardly, into a plurality of stepped edges that support the active elements.

28. The optical switch of claim 27, wherein the well of the membrane is formed of a plurality of layers.

29. The optical switch of claim 28, wherein the well is formed of three layers;
wherein the first layer is composed of an amorphous silicon that is optically transparent.
wherein the second layer is composed of silicon nitride;
wherein the third layer is composed of an amorphous silicon.

30. A method of optically switching between a reflecting state and an anti-reflecting state, comprising:
forming a base that includes a substrate;
suspending a membrane over the substrate to form an air gap between the substrate and the membrane and to allow the membrane to freely deform relative to the substrate; and
securing an actuator between the base and the membrane, to control the air gap by deforming the membrane, and to allow the switching between the reflecting and anti-reflecting states.

31. The method of claim 30, wherein the actuator is made of an adaptive material.

32. The method of claim 31, wherein the adaptive material comprises an electrostrictive material.

33. The method of claim 31, wherein the adaptive material comprises a piezoelectric material.

34. The method of claim 31, wherein a maximum reflection state is realized when an air gap thickness is equal to a multiple of a quarter wavelength of an impinging optical beam.

35. The method of claim 31, wherein the anti-reflecting state is realized when an air gap thickness is not equal to a multiple of a quarter wavelength of an impinging optical beam.

36. The method of claim 31, wherein the anti-reflecting state is realized when an air gap thickness is approximately zero.

37. The method of claim 30, wherein the membrane is made of a non-electrically conductive material.

38. The method of claim 30, wherein the movement of the membrane is caused by any of a contraction or expansion of the actuator.

39. The method of claim 30, wherein the actuator comprises a plurality of active elements.

40. The method of claim 39, wherein the actuator comprises four active elements that support, and are equidistally disposed around the membrane.

41. The method of claim 39, wherein each of the active elements develops an electric potential in response to mechanical deformation, and that mechanically deforms in response to an applied electric potential.

42. The method of claim 33, wherein the piezoelectric material is of a ceramic type.

43. The method of claim 33, wherein the piezoelectric material is of a polymeric type.

44. The method of claim 42, wherein the ceramic type piezoelectric material is made of: any of quartz, cadmium sulphide, or a titanate compound.

45. The method of claim 43, wherein the titanate compound is any of: barium titanate, lead titanate, or lead zirconium titanate.

46. The method of claim 43, wherein the polymeric type piezoelectric material is made of any of: polyvinylidene fluoride, a copolymer of vinylidene fluoride, trifluoroethylene, a copolymer of vinylidene fluoride and tetrafluoroethylene, or a copolymer of vinylidene cyanide and vinyl acetate.

47. The method of claim 39, wherein the base is comprised of a generally cylindrically shaped leg that contours the air gap to support the active elements.

48. The method of claim 47, wherein for each active element, the leg comprises a stepped edge on which one end of the active element is seated.

49. The method of claim 48, wherein when the active element is secured to the stepped edge, an air pocket is formed between the active element and the leg, to allow free displacement of the active elements, and to prevent friction between the actuator and the base.

50. The method of claim 30, wherein the substrate is formed of a conductive material that is optically transparent over an operating optical bandwidth.

51. The method of claim 30, wherein the substrate is formed of a conductive material that is optically absorbing over an operating optical bandwidth.

52. The method of claim 51, wherein the substrate is made of any of: silicon, gallium arsenide, indium phosphide, germanium, or indium tin oxide coated glass.

53. The method of claim 39, wherein when the active elements are secured between the base and the membrane, they create a lever effect so that the membrane is deformed along an optical of an impinging optical beam.

54. The method of claim 39, wherein the membrane comprises a well that is contoured by a peripheral wall.

55. The method of claim 54, wherein the peripheral wall is circularly shaped.

56. The method of claim 55, wherein the membrane extends radially outwardly, into a plurality of stepped edges that support the active elements.

57. The method of claim 56, wherein the well of the membrane is formed of a plurality of layers.

58. The method of claim 57, wherein the well is formed of three layers;
wherein the first layer is composed of an amorphous silicon that is optically transparent;
wherein the second layer is composed of silicon nitride;
wherein the third layer is composed of an amorphous silicon.

* * * * *